(12) United States Patent
Zhu et al.

(10) Patent No.: US 12,380,678 B2
(45) Date of Patent: Aug. 5, 2025

(54) GLOBAL AND LOCAL FEATURE RECONSTRUCTION NETWORK-BASED MEDICAL IMAGE SEGMENTATION METHOD

(71) Applicant: SOOCHOW UNIVERSITY, Suzhou (CN)

(72) Inventors: Weifang Zhu, Suzhou (CN); Jiahuan Song, Suzhou (CN); Xinjian Chen, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 343 days.

(21) Appl. No.: 18/195,649

(22) Filed: May 10, 2023

(65) Prior Publication Data
US 2023/0274531 A1    Aug. 31, 2023

Related U.S. Application Data

(63) Continuation of application No. PCT/CN2022/078318, filed on Feb. 28, 2022.

(51) Int. Cl.
*G06V 10/77* (2022.01)
*G06T 7/10* (2017.01)
(Continued)

(52) U.S. Cl.
CPC ............ *G06V 10/7715* (2022.01); *G06T 7/10* (2017.01); *G06V 10/774* (2022.01); *G06V 10/82* (2022.01);
(Continued)

(58) Field of Classification Search
CPC ........... G06T 2207/20084; G06T 2207/20081; G06T 7/0012; G06T 7/10–194;
(Continued)

(56) References Cited

U.S. PATENT DOCUMENTS

2021/0201499 A1    7/2021  Qin et al.

FOREIGN PATENT DOCUMENTS

| | | |
|---|---|---|
| CN | 110689083 A | 1/2020 |
| CN | 114004847 A | 2/2022 |
| WO | 2021244621 A1 | 12/2021 |

OTHER PUBLICATIONS

Hu, Jie, et al, Squeeze-and-Excitation Networks, May 2019, arXiv: 1709.01507v4, https://arxiv.org/pdf/1709.01507, (Year: 2019).*

(Continued)

*Primary Examiner* — Raphael Schwartz
(74) *Attorney, Agent, or Firm* — SZDC Law PC

(57) ABSTRACT

The invention provides a global and local feature reconstruction network-based medical image segmentation method, device, apparatus and a computer storage medium. In the invention, a global feature reconstruction GFR module introduces semantic information from high-level into low-level features through a global descriptor, to eliminate a semantic gap between features in different levels, and a feature map is reconstructed by using a cross-level global descriptor, to implement long-distance feature dependency modeling. A local feature reconstruction LFR module implements dynamic upsampling of features based on the guidance of a low-stage feature map. Local features are dynamically reconstructed, so that spatial detail information in the low-stage feature map is transferred to a high-stage feature map, thereby implementing spatial information recovery of features, overcoming the problems such as insufficient global feature extraction and long-distance feature dependency modeling capabilities and insufficient recovery of spatial information of a feature map in a U-shaped encoder-decoder network.

10 Claims, 4 Drawing Sheets

(51) Int. Cl.
*G06V 10/774* (2022.01)
*G06V 10/82* (2022.01)
*G06V 20/70* (2022.01)

(52) U.S. Cl.
CPC .... *G06V 20/70* (2022.01); *G06T 2207/20081* (2013.01); *G06T 2207/20084* (2013.01); *G06T 2207/30004* (2013.01); *G06V 2201/03* (2022.01)

(58) Field of Classification Search
CPC ............ G06N 3/045; G06N 3/08; G06N 3/04; G06N 20/00
See application file for complete search history.

(56) References Cited

OTHER PUBLICATIONS

Oktay et al, Attention U-Net: Learning Where to Look for the Pancreas, May 2018, arXiv:1804.03999v3 (Year: 2018).*
Wang, Carafe: Content-Aware ReAssembly of FEatures, Oct. 2019, arXiv:1905.02188v3 (Year: 2019).*
Shuanglang Feng et al., "CPFNet: Context Pyramid Fusion Network for Medical Image Segmentation" IEEE Transactions on Medical Imaging, vol. 39, No. 10, Oct. 2020, pp. 3008-3018 (Oct. 31, 2020).

* cited by examiner

GLOBAL AND LOCAL FEATURE RECONSTRUCTION NETWORK-BASED MEDICAL IMAGE SEGMENTATION METHOD

This application is a Continuation Application of PCT/CN2022/078318, filed on Feb. 28, 2022, which claims priority to Chinese Patent Application No. 202111573573.X, filed on Feb. 9, 2022, which is incorporated by reference for all purposes as if fully set forth herein.

FIELD OF THE INVENTION

The present invention relates to the field of medical image segmentation technologies, and in particular, to a global and local feature reconstruction network-based medical image segmentation method, device, and apparatus and a computer storage medium.

DESCRIPTION OF THE RELATED ART

In existing technologies, global feature extraction, long-range feature dependency modeling, and recovery of feature map spatial information are crucial for an encoder-decoder structure network represented by U-Net in medical image segmentation tasks. Although the encoder-decoder structure network represented by U-Net has obtained good segmentation performance in many medical image segmentation tasks, the following deficiencies still exist.

(1) U-Net only performs feature fusion at different levels, and its global context extraction capability is insufficient. Although a downsampling operation of feature maps makes a convolutional network have a larger receptive field and long-range dependency between features can be obtained at deeper levels, an actual receptive field of the network is much smaller than its theoretical receptive field as the depth of the network increases. Recent improvements in this area mainly include a multi-scale feature fusion technique and an attention mechanism. Atrous spatial pyramid pooling (ASPP) used in DeepLabV3+ extracts multi-scale features with the help of multiple parallel atrous convolutions, and finally concatenates the feature maps in channel dimension and recovers the feature maps to the original channel dimension size using 1×1 convolution. Similarly, PSPNet uses a pyramid pooling module (PPM) to obtain multi-scale features. However, due to the use of shared convolution parameters, none of these approaches can dynamically process features at different locations, and these approaches lack spatial awareness of different context dependencies required for processing features at different locations. In the attention mechanism, long-range features are modeled in a dynamic manner, and representative studies are, for example, a non-local module based on a spatial attention mechanism and a squeeze-and-excitation (SE) module based on a channel attention mechanism. The non-local module establishes an association between pixels in a space, allowing a network to generate powerful pixel-level feature representation. However, the non-local module needs to calculate a similarity between each pair of pixels, and therefore has high computational complexity. The SE module extracts global spatial features, distributes the global features to different positions of the feature map with the same weights, and enhances or suppresses different channel features. The SE module treats all pixels equally and is not robust enough for pixel-level segmentation tasks such as semantic segmentation.

(2) Simple skip connections indiscriminately unite local information at different levels, ignoring semantic information. On one hand, low-level features contain too much noise and therefore cannot provide sufficient high-resolution semantic guidance. On the other hand, direct concatenation of features suffers from the problem of misaligned semantic information between feature maps. To efficiently fuse features and suppress the impact of irrelevant noise in low-level feature maps, methods such as Attention U-Net, AG-Net, and ACNet use gating mechanisms to suppress or highlight different semantic information, making feature fusion more flexible. However, none of these methods addresses semantic misalignment between high-level features and low-level features.

(3) Feature upsampling in a decoder stage usually uses nearest neighbor interpolation or bilinear interpolation that depends only on an inter-pixel distance, and spatial information of features is not sufficiently recovered. Transposed convolution-based upsampling uses the same convolution kernel over a whole feature map, ignoring semantic information of features at different locations. SFNet proposes a semantic flow-based upsampling approach to implement semantic alignment before feature fusion, and achieves excellent performance in natural image segmentation tasks with a deep supervision mechanism. A sub-pixel convolution technique based on the assumption that spatial information is contained in channels is widely used in semantic image segmentation. For example, data-dependent up-sampling (DUpsampling) uses a linear transformation to approximate structural information of labels. Similar to transposed convolution, DUpsampling uses the same parameters over an entire feature map. A Content-Aware ReAssembly of Features (CARAFE) method reassembles neighborhood features to implement upsampling, but cannot integrate rich spatial information of low-level features.

SUMMARY OF THE INVENTION

For this, a technical problem to be resolved by the present invention is to overcome the problems such as insufficient global feature extraction and long-distance feature dependency modeling capabilities and insufficient recovery of spatial information of a feature map in a U-shaped encoder-decoder network in the prior art.

To resolve the foregoing technical problems, the present invention provides a global and local feature reconstruction network-based medical image segmentation method, including:

inputting a to-be-detected image into a pretrained global and local feature reconstruction network, where the global and local feature reconstruction network includes a feature encoding module, a global feature reconstruction GFR module, and a feature decoding module based on a local feature reconstruction LFR module, and the global feature reconstruction GFR module is embedded in a skip connection between the feature encoding module and the feature decoding module;

performing feature extraction on the to-be-detected image by using the feature encoding module, to obtain feature maps in a plurality of levels;

generating a global descriptor for each level of feature map by using the global feature reconstruction GFR module;

generating a cross-level global descriptor of the each level of feature map by using the global feature reconstruction GFR module in combination with the global descriptor of the each level of feature map and a global descriptor of a high-level feature map;

predicting a reconstruction weight of all pixels in the each level of feature map by using the global feature reconstruction GFR module, multiplying the reconstruction weight by the cross-level global descriptor to implement feature reconstruction, and performing addition with the each level of feature map to obtain a global reconstruction feature map of each level;

performing fusion upsampling on an adjacent higher-stage local reconstruction feature map and an adjacent lower-level global reconstruction feature map by using a local feature reconstruction LFR module in the feature decoding module, to obtain a current-stage high-resolution semantic feature map; and upsampling a first-stage high-resolution semantic feature map to obtain a target segmentation prediction image.

Preferably, a loss function used in a training process of the global and local feature reconstruction network is a total loss function $L_{total}=L_{seg}+\lambda\Sigma_{l=1}^{4} L_{A_l}$, where l is the number of levels, $L_{seg}$ is a joint segmentation loss function based on a cross-entropy loss and a Dice loss, $L_{A_l}$ is a joint deep supervision loss function based on a cross-entropy loss and a Dice loss, and $\lambda$ is a trade-off coefficient between a segmentation loss $L_{seg}$ and a deep supervision loss $L_{A_l}$.

Preferably, the feature encoding module uses ImageNet pretrained ResNet34 as a backbone network with a last global pooling layer and a fully connected layer removed.

Preferably, the generating a global descriptor for each level of feature map by using the global feature reconstruction GFR module includes:

flattening a feature map according to a spatial dimension of the feature map, to obtain $X_l \in \mathbb{R}^{d_{in} \times HW}$ as an input of the global feature reconstruction GFR module;

inputting $X_l$ into two 1*1 convolution layers to generate an attention map $A_l \in \mathbb{R}^{d_k \times HW}$ and an embedded feature $A_l \in \mathbb{R}^{d_k \times HW}$ respectively; and generating a global descriptor of the feature map according to the attention map and the embedded feature:

$$Z_l=[z_l^1, z_l^2, \ldots, z_l^{d_k}]=\rho(A_l)B_l^T \in \mathbb{R}^{d_k \times d_h},$$

where l represents a number of a level in which the feature map is located, $d_{in}$ represents a quantity of channels of the feature map, H and W represent a height and a width of the feature map respectively, $\rho(\cdot)$ represents performing a softmax normalization operation according to the spatial dimension, to make a weight sum equal to 1, $d_h$ and $d_k$ represent a dimension of the global descriptor and a quantity of global descriptors respectively, the dimension of the global descriptor of the each level of feature map is set to a minimum quantity of channels in features in all levels, and each global descriptor $z_l^s$ (s=1, 2, 3, . . . , $d_k$) is obtained by performing weighted summation on all features in a space $B_l$.

Preferably, the generating a cross-level global descriptor of the each level of feature map by using the global feature reconstruction GFR module in combination with the global descriptor of the each level of feature map and a global descriptor of a high-level feature map includes:

generating a cross-level global descriptor $Z_l$ of an $l^{th}$ level by using $Z'_l$=concat($Z_l, Z_{l+1}, \ldots, Z_{l+m}$) $\in \mathbb{R}^{(m+1)d_k \times d_h}$, where $z_{l+1}, \ldots, Z_{l+m}$ represent global descriptors generated from feature maps of an $(l+1)^{th}$ level to an $(l+m)^{th}$ level, and concat represents a concatenation operation of the global descriptors.

Preferably, the predicting a reconstruction weight of all pixels in the each level of feature map by using the global feature reconstruction GFR module, multiplying the reconstruction weight by the cross-level global descriptor to implement feature reconstruction, and performing addition with the each level of feature map to obtain a global reconstruction feature map of each level includes:

making a feature map $X_l$ pass through one 1*1 convolution layer to obtain a reconstruction weight $V_l \in \mathbb{R}^{(m+1)d_k \times HW}$, where m represents a quantity of global descriptors that are generated from a high-level feature map corresponding to a feature map in an $l^{th}$ level and are connected to the feature map of the $l^{th}$ level;

normalizing the reconstruction weight by using a softmax function in a channel direction to obtain a reconstructed feature $\widetilde{X}_l = Z'_l{}^T \text{softmax}(V_l)$; and recovering a quantity of channels from the reconstructed feature $\widetilde{X}_l \in \mathbb{R}^{d_h \times HW}$ through a 1*1 convolution layer, and adding the quantity of channels to the feature map $X_l$ to obtain the global reconstruction feature map.

Preferably, the performing fusion upsampling on an adjacent higher-stage local reconstruction feature map and an adjacent lower-level global reconstruction feature map by using a local feature reconstruction LFR module in the feature decoding module, to obtain a current-stage high-resolution semantic feature map includes:

making the feature decoding module include local feature reconstruction LFR modules of a plurality of stages, inputs of local feature reconstruction LFR modules being denoted as Y and Z, where the input Y of a fourth-stage LFR module is an output of a fourth-level global feature reconstruction GFR module, the input Z is an output of a third-level global feature reconstruction GFR module, the input Y of an first-stage LFR module is an output of a second-stage LFR module, the input Z is a feature map of an encoder zeroth level, and inputs Y and Z of a third-stage LFR module and the second-stage LFR module are an output of an adjacent higher-stage LFR module and an output of an adjacent lower-level GFR module respectively;

making two input feature maps Y and Z of the local feature reconstruction LFR module pass through two 1*1 convolution layers to reduce a quantity of channels respectively;

performing bilinear upsampling on Y to make the two input feature maps reach the same spatial resolution, adding and fusing the two input feature maps element-wise, and making a result pass through one 3×3 convolution layer to obtain a predicted value $\mathcal{K} = \text{softmax}(\text{conv}_f(\text{Up}(\theta(Y)) + \psi(Z)))$ of a local reconstruction kernel $\mathcal{K} \in \mathbb{R}^{k^2 \times H \times W}$, where k is a neighbourhood size of local feature reconstruction, H and W are a height and a width of the feature map, $\theta(\cdot)$ and $\psi(\cdot)$ represent 1×1 convolutions with parameters $w_\theta$ and $w_\psi$ respectively, Up($\cdot$) represents bilinear interpolation upsampling, $\text{conv}_f(\cdot)$ represents a 3×3 convolution, and a softmax function is used for normalizing a predicted reconstruction kernel;

making Y pass through a 3×3 convolution layer to reduce a quantity of channels, and using bilinear interpolation upsampling Up($\cdot$) for upsampling to have the same resolution as Z, to obtain $\overline{Y}=\text{Up}(\text{conv}(Y))$;

performing linear combination on a k×k neighbourhood at each position [i,j] by using the predicted value of the local reconstruction kernel to implement local feature reconstruction:

$$Y'[i,j]=\Sigma_{n=-r}^{r}\Sigma_{m=-r}^{r} \mathcal{K}_{[i,j]}[n,m]\overline{Y}[i+n,j+m],$$

where $\mathcal{K}_{[i,j]} \in R^{k \times k}, r = \lfloor k/2 \rfloor$, and [i+n,j+m] are neighbourhood features;

concatenating a reconstructed local feature map Y' and the input Z according to a channel dimension, and performing fusion using two 3×3 convolution layers to obtain an output $Y_{out}$ of a current-stage LFR module; and using $Y_{out}$ and the adjacent lower-level global reconstruction feature map or the feature map of the encoder zeroth level as two inputs of a next stage LFR module, to obtain the current-stage high-resolution semantic feature map.

The present invention further provides a global and local feature reconstruction network-based medical image segmentation apparatus, including:

an input module, configured to input a to-be-detected image into a pretrained global and local feature reconstruction network, where the global and local feature reconstruction network includes a feature encoding module, a global feature reconstruction GFR module, and a feature decoding module based on a local feature reconstruction LFR module, and the global feature reconstruction GFR module is embedded in a skip connection between the feature encoding module and the feature decoding module;

a feature encoding module, configured to perform feature extraction on the to-be-detected image by using the feature encoding module, to obtain feature maps in a plurality of levels;

a global descriptor generation module, configured to generate a global descriptor for each level of feature map by using the global feature reconstruction GFR module;

a cross-level descriptor generation module, configured to generate a cross-level global descriptor of the each level of feature map by using the global feature reconstruction GFR module in combination with the global descriptor of the each level of feature map and a global descriptor of a high-level feature map;

a global feature reconstruction module, configured to predict a reconstruction weight of all pixels in the each level of feature map by using the global feature reconstruction GFR module, multiply the reconstruction weight by the cross-level global descriptor to implement feature reconstruction, and perform addition with the each level of feature map to obtain a global reconstruction feature map of each level; and a feature decoding module, configured to perform fusion upsampling on an adjacent higher-stage local reconstruction feature map and an adjacent lower-level global reconstruction feature map by using a local feature reconstruction module in the feature decoding module, to obtain a current-stage high-resolution semantic feature map, and upsample a first-stage high-resolution semantic feature map to obtain a target segmentation prediction image.

The present invention further provides a global and local feature reconstruction network-based medical image segmentation device, including:

a memory, configured to store a computer program; and a processor, configured to execute the computer program to implement the steps of the foregoing global and local feature reconstruction network-based medical image segmentation method.

The present invention further provides a computer-readable storage medium, on which a computer program is stored, the computer program being executed by a processor to implement the steps of the global and local feature reconstruction network-based medical image segmentation method.

Compared with the prior art, the foregoing technical solution of the present invention has the following advantages:

In the global and local feature reconstruction network-based medical image segmentation method provided in the present invention, a global and local feature reconstruction-based U-shaped encoder-decoder structure segmentation network is designed. A global feature reconstruction GFR module introduces semantic information from high-level features into low-level features through a global descriptor, to eliminate a semantic gap between features in different levels, and a feature map is reconstructed by using a cross-level global descriptor, to enable the network to obtain a global receptive field, to implement long-distance feature dependency modeling, thereby overcoming the deficiency of an insufficient global context feature acquisition capability of simple skip connections, and resolving unbalanced semantic information in feature fusion from a global perspective. A local feature reconstruction LFR module implements dynamic upsampling of features based on the guidance of a low-stage feature map. Local features are dynamically reconstructed, so that spatial detail information in the low-stage feature map is transferred to a high-stage feature map, to implement spatial information recovery of features, thereby overcoming the deficiency of an insufficient spatial information recovery capability of high-stage features in an encoder, resolving unbalanced semantic information in feature fusion from a local perspective, and improving the accuracy of image segmentation.

BRIEF DESCRIPTION OF THE DRAWINGS

To make the content of the present invention clearer and more comprehensible, the present invention is further described in detail below according to specific embodiments of the present invention and the accompanying draws. Where.

DETAILED DESCRIPTION OF THE PREFERRED EMBODIMENTS

The core of the present invention is to provide a global and local feature reconstruction network-based medical image segmentation method, device, and apparatus and a computer storage medium, which resolves the problems such as insufficient global feature extraction and long-distance feature dependency modeling capabilities and insufficient recovery of spatial information of a feature map, thereby improving the segmentation accuracy of medical images.

To enable a person skilled in the art to better understand the solutions of the present invention, the present invention is further described below in detail with reference to the accompanying drawings and specific implementations. Apparently, the described embodiments are merely some rather than all of the embodiments of the present invention. All other embodiments obtained by persons of ordinary skill in the art based on the embodiments of the present invention without creative efforts shall fall within the protection scope of the present invention.

Figure 1:
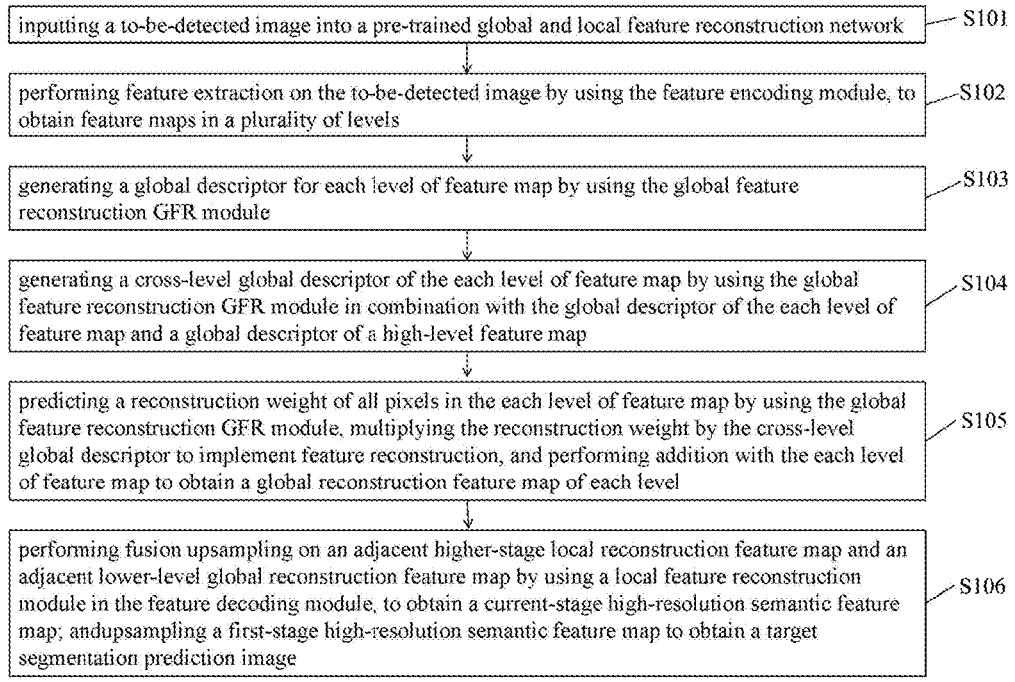
FIG. 1 is a flowchart of implementing a global and local feature reconstruction network-based medical image segmentation method according to the present invention.
Figure 2:
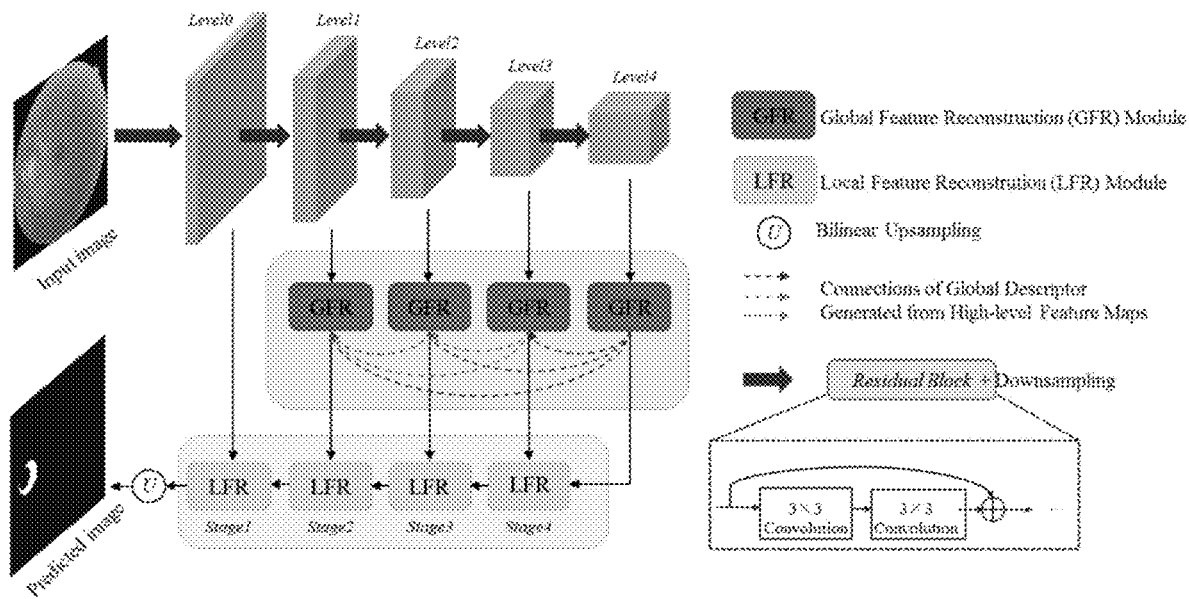
FIG. 2 shows an overall structure of a global and local feature reconstruction network GLFRNet designed in the present invention.

Referring to FIG. 1 and FIG. 2. FIG. 1 is a flowchart of implementing a global and local feature reconstruction network-based medical image segmentation method according to the present invention. FIG. 2 shows an overall structure of a global and local feature reconstruction network GLFRNet designed in the present invention. Specific operation steps are as follows:

S101: Input a to-be-detected image into a pretrained global and local feature reconstruction network,
where the global and local feature reconstruction network GLFRNet includes a feature encoding module, a global feature reconstruction GFR module, and a feature decoding module based on a local feature reconstruction LFR module, and the global feature reconstruction GFR module is embedded in a skip connection between the feature encoding module and the feature decoding module.

The feature encoding module uses ImageNe pretrained ResNet34 t as a backbone network with a last global pooling layer and a fully connected layer removed. A residual mechanism used in ResNet34 can increase a convergence speed of the network and avoid a vanishing gradient problem.

In this embodiment, ResNet34 includes five stages. The first stage includes a 7×7 convolution with a step size of 2, batch normalization, and a Relu activation function. The last four stages include three, four, six, and three residual modules respectively. In each stage, downsampling is performed once, a channel quantity doubles. Downsampling is performed five times in total in ResNet34. Output channel quantities are 64, 64, 128, 256, and 512 respectively. Level 0 to level 4, that is, a total of five levels of feature maps, are labeled in descending order of resolution.

A loss function used in a training process of the global and local feature reconstruction network is a total loss function $L_{total}=L_{seg}+\Sigma_{l=1}^{4} L_{A_l}$,
where l is the number of levesl, $L_{seg}$ is a joint segmentation loss function based on a cross-entropy loss and a Dice loss, $L_{A_l}$ is a joint deep supervision loss function based on a cross-entropy loss and a Dice loss, and A is a trade-off coefficient between a segmentation loss $L_{seg}$ and a deep supervision loss $L_{A_l}$, and has a value of 0.2.

$$L_{seg}=L_{CE}+\alpha L_{Dice},$$

α represents a trade-off coefficient between a cross-entropy loss $L_{CE}$ and a Dice loss $L_{Dice}$, and has a value of 0.5.

$$L_{CE} = -\frac{1}{N}\Sigma_{i=1}^{N}\Sigma_{c=1}^{C}\gamma_{i,c}\log(p_{i,c}),$$

where a total sum of pixels of feature map is N, where i=1, 2, 3, . . . , N represents an $i^{th}$ pixel, and C represents a quantity of classes of segmentation targets. $y_{i,c}$ represents a label of the $i^{th}$ pixel at a c(c=1, 2, . . . C)$^{th}$ class. Each pixel usually only belongs to one class in C. $p_{i,c} \in [0,1]$ represents a prediction probability of the pixel i belonging to the class c according to the model. In the present invention, a final output of the network is processed by using a softmax function, so that a sum of prediction probabilities of all classes is 1.

A Dice loss function calculates an overlap ratio of each class target and a ground truth respectively, and calculates a average by class. A calculation method of the function is, for example:

$$L_{Dice} = 1 - \frac{1}{C}\Sigma_{c=1}^{C}\left(\frac{2\sum_{i=1}^{N}y_{i,c}p_{i,c}+\varepsilon}{\sum_{i=1}^{N}(y_{i,c}+p_{i,c})+\varepsilon}\right),$$

where ε is a smoothing factor for preventing a numerator or a denominator from being zero, and has a value 1e$^{-6}$.

A deep supervision mechanism is used for an attention map $A_l$ in a GFR module. A joint loss function based on a cross-entropy loss and a Dice loss is similarly used for a deep supervision loss function $L_{A_l}$, and is defined as follows:

$$L_{A_l}=L_{CE}+\beta L_{Dice},$$

where β represents a trade-off coefficient between a cross-entropy loss $L_{CE}$ and a Dice loss $L_{Dice}$, and has a value of 0.5.

S102: Perform feature extraction on the to-be-detected image by using the feature encoding module, to obtain feature maps in a plurality of levels.

S103: Generate a global descriptor for each level of feature map by using the global feature reconstruction GFR module.

S104: Generate a cross-level global descriptor of the each level of feature map by using the global feature reconstruction GFR module in combination with the global descriptor of the each level of feature map and a global descriptor of a high-level feature map.

A global feature reconstruction GFR module introduces semantic information from high-level features into low-level features through a global descriptor, to eliminate a semantic gap between features in different levels, and a feature map is reconstructed by using a cross-level global descriptor, to enable the network to obtain a global receptive field, to implement long-distance feature dependency modeling.

S105: Predict a reconstruction weight of all pixels in the each level of feature map by using the global feature reconstruction GFR module, multiply the reconstruction weight by the cross-level global descriptor to implement feature reconstruction, and perform addition with the each level of feature map to obtain a global reconstruction feature map of each level.

S106: Perform fusion upsampling on an adjacent higher-stage local reconstruction feature map and an adjacent lower-level global reconstruction feature map by using a local feature reconstruction LFR module, to obtain a current-stage high-resolution semantic feature map, and upsample a first-stage high-resolution semantic feature map to obtain a target segmentation prediction image.

A local feature reconstruction LFR module implements dynamic upsampling of features based on the guidance of a low-stage feature map. Local features are dynamically reconstructed, so that spatial detail information is transferred to a high-stage feature map, thereby implementing spatial information recovery of features.

The feature decoding module is configured to transfer spatial detail information in a low-stage feature map to a high-stage feature map through dynamic reconstruction of local features by using local feature reconstruction modules in four stages, to obtain a high-resolution semantic feature map, and perform bilinear upsampling once on the high-resolution semantic feature map outputted by a first-stage local reconstruction feature module to obtain a target segmentation prediction image.

In the global and local feature reconstruction network-based medical image segmentation method provided in the present invention, a global and local feature reconstruction-based U-shaped encoder-decoder structure segmentation network is designed. A global feature reconstruction GFR module overcomes the deficiency of an insufficient global context feature acquisition capability of simple skip connections, and resolves unbalanced semantic information in feature fusion from a global perspective. A local feature reconstruction LFR module overcomes the deficiency of an insufficient spatial information recovery capability of high-stage features in an encoder, and resolves unbalanced semantic information in feature fusion from a local perspective.

Figure 3:
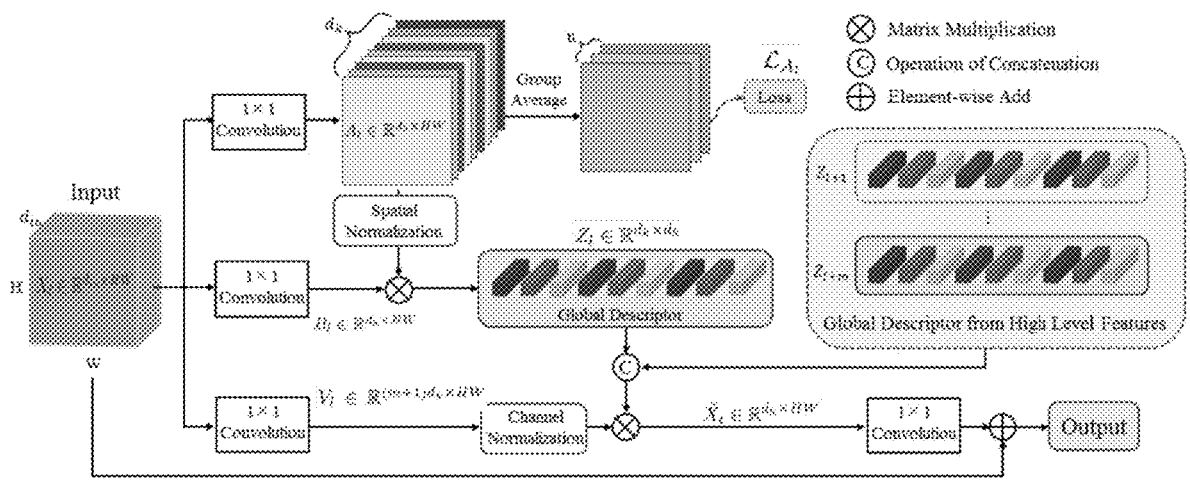
FIG. 3 shows a global feature reconstruction GFR module designed in the present invention.

Based on the foregoing embodiments, referring to FIG. 3, step S103 is further described in this embodiment. Details are as follows:

S131: Flatten a feature map according to a spatial dimension of the feature map, to obtain $X_l \in \mathbb{R}^{d_{in} \times HW}$ as an input of the global feature reconstruction GFR module.

S132: Input $X_l$ into two 1*1 convolution layers to generate an attention map $A_l \in \mathbb{R}^{d_k \times HW}$ and an embedded feature $B_l \in \mathbb{R}^{d_h \times HW}$ respectively.

S133: Generate a global descriptor of the feature map according to the attention map and the embedded feature:

$$Z_l = [z_l^1, z_l^2, \ldots, z_l^{d_k}] = \rho(A_l) B_l^T \in \mathbb{R}^{d_k \times d_h},$$

where l represents a number of a level in which the feature map is located, $d_{in}$ represents a quantity of channels of the feature map, H and W represent a height and a width of the feature map respectively, $\rho(\cdot)$ represents performing a softmax normalization operation according to the spatial dimension, to make a weight sum equal to 1, $d_h$ and $d_k$ represent a dimension of the global descriptor and a quantity of global descriptors respectively. Because feature maps of different levels have different channel quantities, to reduce a calculation cost and dimensions of weights, the dimension of the global descriptor of the each level of feature map is set to a minimum quantity of channels in features in all levels, which is 64 in this embodiment. Each global descriptor $z_l^s (s=1,2,3, \ldots, d_k)$ is obtained by performing weighted summation on all features in a space $B_l$. Therefore, the network may autonomously learn and select global features for the desired class. This is a major difference between the present invention and SE module (Squeeze-and-Excitation Networks), which uses global pooling based on averaging of all pixels, resulting the obtained global features are not class-discriminative.

To enhance the selectivity of global descriptors for class features, in the present invention, a deep supervision mechanism is used for an attention map $A_l$. The attention map $A_l$ is divided according to channels into n groups, where n represents a quantity of segmentation classes. Next, each group in $A_l$ is averaged according to channels, to obtain prediction with deep supervision. An $s^{th}$ global descriptor $z_l^s (s=1, 2, 3, \ldots, d_k)$ depends on an attention map of an $s^{th}$ channel in $A_l \in \mathbb{R}^{d_k \times HW}$. Different groups in $A_l$ belong to attention maps of different classes. Attention maps in the same group belong to the same class. However, attention may be paid to different features in the same class. Each class includes $d_k/n$ global descriptors. In an extreme case $d_k = n$, the global descriptor is a class center of each class. When a plurality of global descriptors are used for each class, a comprehensive class feature representation can be implemented in a case of large intra-class differences.

Based on the foregoing embodiments, step S104 is further described in this embodiment. Details are as follows:

generating a cross-level global descriptor $Z'_l$ of an $l^{th}$ level by using $Z'_l = \text{concat}(Z_l, Z_{l+1}, \ldots, Z_{l+m}) \in \mathbb{R}^{(m+1)d_k \times d_h}$, where $Z_{l+1}, \ldots, Z_{l+m}$ represent global descriptors generated from feature maps of an $(l+1)^{th}$ level to an $(l+m)^{th}$ level, and concat represents a concatenation operation of the global descriptors.

For features of an $l^{th}$ level, if a global descriptor $Z_l$ generated from the features in the level is used for feature reconstruction, an association may be established between features at positions in a space of the level by using the global descriptor $Z_l$. The guidance of semantic information in a high-level feature map may be obtained in a feature reconstruction manner by using a cross-level global descriptor for low-level features. Therefore, a reconstructed low-level feature map simultaneously obtains semantic information and spatial detail information. That is, the GFR module implements transfer of semantic information from the high-level feature map to the low-level feature map by using a few of global descriptors.

Based on the foregoing embodiments, step S105 is further described in this embodiment. Details are as follows:

The main work of this step is reconstructing the features at the locations by using a cross-level global descriptor $Z'_l$.

S151: Make a feature map $X_l$ pass through one 1*1 convolution layer to obtain a reconstruction weight $v_l \in \mathbb{R}^{(m+1)d_k \times HW}$, where m represents a quantity of global descriptors that are generated from a high-level feature map corresponding to a feature map in an $l^{th}$ level and are connected to the feature map of the $l^{th}$ level.

S152: Normalize the reconstruction weight by using a softmax function in a channel direction to obtain a reconstructed feature $\tilde{X}_l = Z'^T_l \text{softmax}(V_l)$, thereby enhancing the selection capability of a global descriptor.

$\tilde{X}_l \in \mathbb{R}^{d_h \times HW}$ represents a reconstructed feature, and a feature value of each position in $\tilde{X}_l$ is obtained through recombination of cross-level global descriptors, and therefore the effect of suppressing irrelevant noise. For features of consistent classes, global descriptors of the same class tend to be selected for reconstruction, thereby reducing intra-class differences. For features of inconsistent classes, global descriptors of different classes tend to be selected for reconstruction, thereby enhancing inter-class differences.

S153: Recover a quantity of channels from the reconstructed feature $\tilde{X}_l$ through a 1*1 convolution layer, and add the quantity of channels to the feature map $X_l$ to obtain the global reconstruction feature map.

Figure 4:
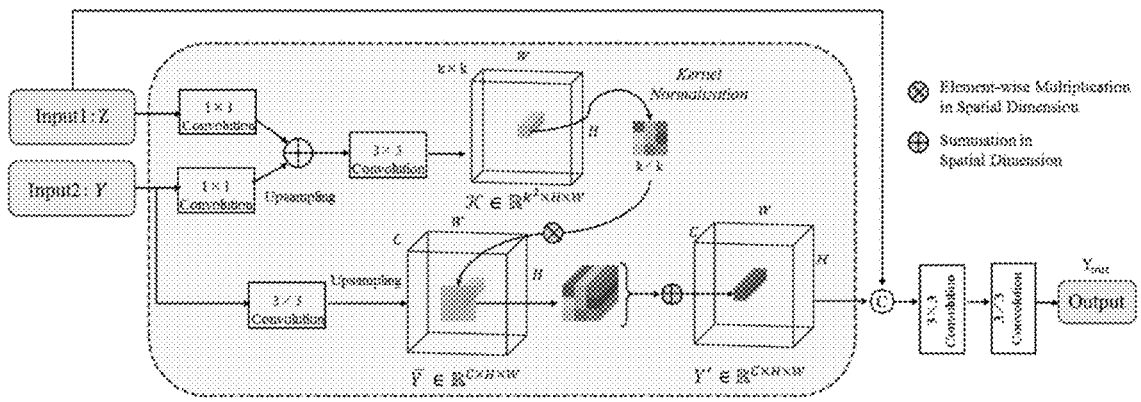
FIG. 4 shows a local feature reconstruction LFR module designed in the present invention.

Referring to FIG. 4, based on the foregoing embodiments, step S106 is further described in this embodiment. Specific operations are as follows:

S161: Make the feature decoding module include local feature reconstruction modules of four stages, inputs of local feature reconstruction LFR modules being denoted as Y and Z, where the input Y of a fourth-stage LFR module is an output of a fourth-level global feature reconstruction GFR module, the input Z is an output of a third-level global feature reconstruction GFR module, the input Y of an first-stage LFR module is an output of a second-stage LFR module, the input Z is a feature map of an encoder zeroth level, and inputs Y and Z of a third-stage LFR module and the second-stage LFR module are an output of an adjacent higher-stage LFR module and an output of an adjacent lower-level GFR module respectively.

S162: Make two input feature maps Y and Z of the local feature reconstruction LFR module pass through two 1*1 convolution layers to reduce a quantity of channels respectively.

S163: Perform bilinear upsampling on Y to make the two input feature maps reach the same spatial resolution, add and fuse the two input feature maps element-wise, and make a result pass through one 3×3 convolution layer to obtain a predicted value $\mathcal{K}$ =softmax (conv$_f$(Up(θ(Y))+ψ(Z))) of a local reconstruction kernel $\mathcal{K} \in \mathbb{R}^{k^2H\times W}$, where k is a neighbourhood size of local feature reconstruction, H and W are a height and a width of the feature map, θ(·) and ψ(·) represent 1×1 convolutions with parameters $w_θ$ and $w_ψ$, respectively, Up(·) represents bilinear interpolation upsampling, conv$_f$(·) represents a 3×3 convolution, and a softmax function is used for normalizing a predicted reconstruction kernel;

S164: Make Y pass through a 3×3 convolution layer to reduce a quantity of channels, and use bilinear interpolation upsampling Up(·) for upsampling to have the same resolution as Z, to obtain $\bar{Y}$=Up(conv(Y));

S165: Perform linear combination on a k×k neighbourhood at each position [i,j] by using the predicted value of the local reconstruction kernel to implement local feature reconstruction:

$$Y'[i,j]=\Sigma_{n=-r}^{r}\Sigma_{m=-r}^{r} \mathcal{K}_{[i,j]}[n,m]\bar{Y}[i+n,j+m],$$

where $\mathcal{K}_{[i,j]} \in \mathbb{R}^{k\times k}$, r=⌊k/2⌋, and [i+n,j+m] are neighbourhood features.

To keep relative position information and obtain an upsampled feature map with rich semantic information in a reconstruction process, linear combination is performed on a k×k neighborhood of each position [i,j] to implement local feature reconstruction. Because semantic information of Y and spatial information of Z are fused in a prediction process of a reconstruction kernel, a dynamic upsampling mechanism of features used in local feature reconstruction is more flexible than an upsampling manner such as bilinear interpolation or transposed convolution, making related feature values in a neighborhood attract more attention. Inconsistency of classes and features often occurs at an edge of a segmentation target. That is, a feature at [i,j] and a neighborhood feature [i+n,j+m] of the feature have different feature values but the same class label. The LFR module can resolve such inconsistency, thereby improving the recognition accuracy of a target edge. For example, when a predicted weight of $\mathcal{K}_{[i,j]}[n, m]$ is close to 1 and weights of other positions are close to 0, a position [i+n,j+m] attracts all attention of [i,j].

A feature $Y'[i,j] \approx \bar{Y}[i+n,j+m]$ is reconstructed according to $Y'[i,j]=\Sigma_{n=-r}^{r}\Sigma_{m=-r}^{r} \mathcal{K}_{[i,j]}[n, m]\bar{Y}[i+n,j+m]$, so that feature values of the two may become closer.

S166: Concate a reconstructed local feature map Y' and the input Z according to a channel dimension, and perform fusion using two 3×3 convolution layers to obtain an output Your of a current-stage LFR module.

S167: Use Knit and the adjacent lower-level global reconstruction feature map or the feature map of the encoder zeroth level as two inputs of a next stage LFR module.

S168: Perform bilinear upsampling once on a high-resolution semantic feature map outputted by a first-stage LFR module to obtain a final target segmentation prediction image.

Based on the foregoing embodiments, in this embodiment, to verify the effectiveness and universality of the method in the present invention, this method is verified by using various medical image segmentation tasks such as colorectal polyp segmentation in colonoscopy images, segmentation of choroidal atrophy in fundus images, retinal fluid segmentation in retinal optical coherence tomography OCT images, and multi-organ segmentation in abdominal CT images. Details are as follows:

Experiment 1: Polyp segmentation in colonoscopy images Colorectal cancer has high incidence and mortality rates and poses a serious threat to the health of humans. Colorectal polyp is considered an early symptom of colorectal cancer. Therefore, the automatic segmentation of colorectal polyp in colonoscopy images is crucial and may assist clinicians in accurately locating a polyp area for further analysis. Colorectal polyp varies greatly in shape, and the color of the polyp is very similar to that of other background tissue. Therefore, the segmentation of colorectal polyp is very challenging.

Kvasir-SEG is a large-scale, challenging colonoscopy image data set including 1000 images with colorectal polyp. The 1000 images are randomly divided into a training set (525 images), a validation set (175 images), and a test set (300 images). The resolutions of the images vary from 332×487 to 1920×1072. Therefore, for simplicity, the images are uniformly sampled to 512×448, with an average aspect ratio maintained. Data augmentation is performed by using online random contrast transformation, brightness transformation, left-right flip, and up-down flip. A Dice coefficient, an intersection over union (IoU), and an accuracy (Acc) are used as segmentation evaluation indicators.

(a) In comparison experiments, the method in the present invention is compared with other excellent convolutional neural network based segmentation networks, including U-Net, attention U-Net, U-Net++, CE-Net, PSPNet, CPFNet, GCN, SFNet, DeepLabV3+, PraNet, and EMANet. To evaluate the effectiveness of the global feature reconstruction GFR module and the local feature reconstruction LFR module provided in the present invention, corresponding ablation experiments are performed. For ease of description, U-Net with ImageNet pretrained ResNet34 as encoder is referred to as a baseline network. Table 1 lists results of corresponding comparison experiments and ablation experiments.

Table 1 Results of comparison experiments and ablation experiments of segmentation of colorectal polyp in colonoscopy images (p-value represents a statistical difference obtained by performing a Wilcoxon signed-rank test on average Dice coefficients of GLFRNet in the present invention and other methods, and when p-value is less than 0.05, it indicates that the two have a significant difference).

convolution-based receptive field blocks (RFB) as skip connections. The HarDNet-MSEG network has the similar overall encoder-decoder structure as the GLFRNet network in the present invention, but has much lower segmentation performance than the GLFRNet network in the present invention on Kvasir-SEG dataset. Possible reasons are as follows: (i) in HarDNet-MSEG decoder, the use of element-wise multiplication-based dense feature fusion treats features in all levels equally. The local feature reconstruction LFR module provided in the present invention fully consid-

TABLE 1

| | Method | Dice (%) | IoU (%) | Acc (%) | GFLOPs | p-value |
|---|---|---|---|---|---|---|
| Comparison experiment | U-Net | 79.15 | 69.3 | 93.82 | 27.33 | <0.001 |
| | Attention U-Net | 79.63 | 70.51 | 93.77 | 36.83 | <0.001 |
| | UNet++ | 82.28 | 73.52 | 94.57 | 121.33 | <0.001 |
| | CE-Net | 88.02 | 81.5 | 96.18 | 31.21 | <0.001 |
| | PSPNet | 88.15 | 81.57 | 96.26 | 96.15 | <0.001 |
| | CPFNet | 88.67 | 82.37 | 96.4 | 28.18 | <0.001 |
| | GCN | 88.75 | 82.63 | 96.36 | 25.42 | <0.001 |
| | DeepLabV3+ | 88.96 | 82.68 | 96.15 | 112.49 | <0.001 |
| | SFNet | 89.03 | 82.89 | 96.58 | 31.32 | <0.001 |
| | PraNet | 89.3 | 82.85 | 96.73 | 18.68 | <0.001 |
| | EMANet | 89.53 | 82.87 | 96.56 | 89.57 | <0.001 |
| | HarDNet-MSEG | 89.98 | 83.9 | 96.57 | 21.08 | 0.001 |
| | TransFuse-S | 90.05 | 83.88 | 96.8 | 40.26 | 0.039 |
| | TransFuse-L | 90.19 | 84.35 | 96.76 | 128.81 | 0.032 |
| Ablation experiment | Baseline network | 87.54 | 81.16 | 95.94 | 29.52 | <0.001 |
| | Baseline network + GFR_w/o_DS | 89.22 | 82.8 | 96.48 | 33.74 | <0.001 |
| | Baseline network + GFR_w/o_Conn | 89.45 | 83.31 | 96.65 | 33.68 | <0.001 |
| | Baseline network + GFR | 90.19 | 84.15 | 96.78 | 33.74 | 0.01 |
| | Baseline network + 1GFR (level4) | 88.41 | 82.2 | 96.42 | 29.56 | <0.001 |
| | Baseline network + 2GFR (level3-4) | 89.83 | 83.81 | 96.8 | 30.37 | 0.011 |
| | Baseline network + 3GFR (level2-4) | 90.09 | 84.09 | 96.66 | 31.46 | 0.009 |
| | Baseline network + LFR_w/o_LG | 88.24 | 81.97 | 96.35 | 27.96 | <0.001 |
| | Baseline network + LFR | 88.69 | 82.77 | 96.61 | 29.37 | 0.022 |
| | Baseline network + 1LFR (stage4) | 87.74 | 81.32 | 96.2 | 28.9 | <0.001 |
| | Baseline network + 2LFR (stage3-4) | 88.16 | 81.79 | 96.21 | 28.33 | <0.001 |
| | Baseline network + 3LFR (stage2-4) | 88.44 | 82.33 | 96.14 | 27.97 | <0.001 |
| | Baseline network (ResNet50) | 87.23 | 80.36 | 95.96 | 196.56 | <0.001 |
| | GLFRNet (ResNet50) | 89.61 | 83.36 | 96.54 | 167.56 | 0.014 |
| | GLFRNet | 91.06 | 85.33 | 97.05 | 32.54 | — |

As shown in Table 1, in the comparison experiments, GLFRNet provided in the present invention has obtained the optimal segmentation performance. Compared with the baseline network, the segmentation performance of GLFR-Net provided in the present invention has been comprehensively enhanced. The Dice coefficient, IoU, and Acc are increased from 87.54%, 81.16%, and 95.94% to 91.06%, 85.33%, and 97.05% respectively. The performances of dilated convolution structure-based networks such as DeepLabV3+ and EMANet are similar to that of encoder-decoder structure-based networks such as PraNet and SFNet. However, feature maps are kept at high resolutions due to dilated convolution, and as a result storage and computational overheads are increased. PraNet is used for implementing real-time segmentation of colorectal polyp, but has much lower performance than the GLFRNet method in the present invention in three indicators. HarDNet-MSEG network uses HarDNet as a backbone network and a multi-scale convolution-based cascaded part decoder and dilated ers associations between feature maps, so that relative position information can be kept in a feature reconstruction process, thereby obtaining upsampled features with rich semantic information. (ii) A self-attention mechanism used in the global feature reconstruction GFR module provided in the present invention is more flexible than convolution and dilated convolution used in RFBs in HarDNet-MSEG network. To combine advantages of CNN and attention mechanism, TransFuse-S and TransFuse-L networks use a transformer and a CNN as dual encoders. In a decoding stage, feature fusion is performed in a manner similar to that of a convolutional block attention module (CBAM). Although the TransFuse-S and TransFuse-L networks have good performances on Kvasir-SEG dataset, the network structure of TransFuse-S and TransFuse-L, especially TransFuse-L, requires a large amount of computational overheads. As shown in Table 1, GFLOPs of the computational overheads of the two are 40.26 and 128.81 respectively. The GFLOPs indicator of the GLFRNet provided in the present invention is 32.54. It indicates that GLFRNet has effectively fused CNN and attention mechanism, and has obtained optimal balance between performance and efficiency.

Figure 5:
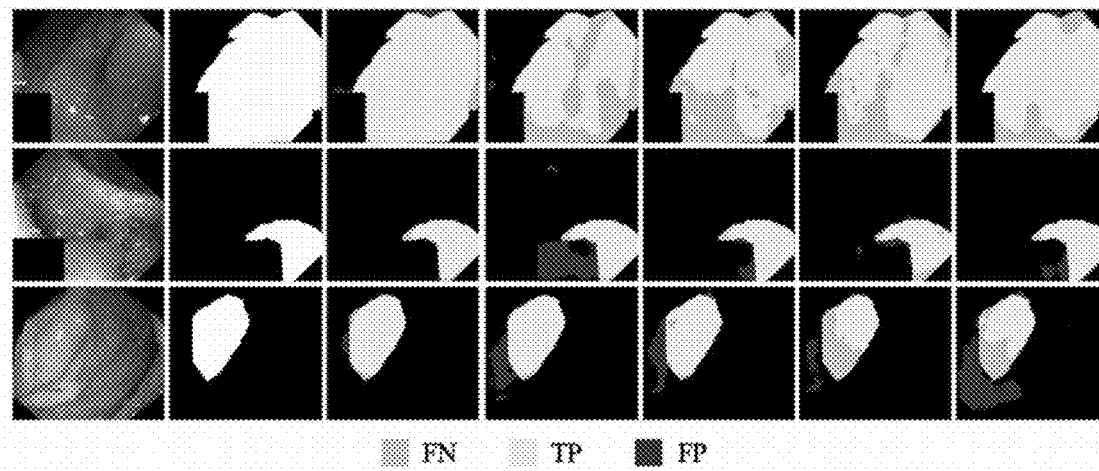
FIG. 5 shows comparison of colorectal polyp segmentation results of GLFRNet and other excellent networks according to the present invention.

To evaluate whether the performance enhancement of the present invention is statistically significant, a Wilcoxon signed-rank test is performed on Dice coefficient of GLFR-Net in the present invention and other methods in the comparison experiments and ablation experiments. As can be seen from Table 1, in all the comparison experiments and ablation experiments, the p-value is less than 0.05, indicating that the performance of the method in the present invention is significantly improved compared with other methods. FIG. 5 shows segmentation results of different networks. It can be found that there are fewer false positives and false negatives in the segmentation results of the GLFR-Net in the present invention. It indicates that GLFRNet has a better global and local context feature fusion capability, so that false positives and false negatives can be adequately reduced.

(b) In the ablation experiment of the GFR module, as can be seen from Table 1, a GFR module without deep supervision is added to a baseline network (baseline network+GFR_w/o_DS), so that the network is improved in all three indicators including Dice coefficient, IoU, and Acc. After deep supervision is used, that is, the GFR module is added to the baseline network (baseline network+GFR), feature selection is implemented by using a global descriptor, thereby implementing further performance enhancement, and completely outperforming the segmentation performance of other excellent networks. To verify the effectiveness of a global descriptor connection, all global descriptor connections from high-level feature maps are deleted, and an obtained network is denoted as a baseline network+GFR_w/o_Conn. Experimental results show that the performance of the network is lower than that of a baseline network+GFR module (baseline network+GFR) in all three indicators, proving the necessity of a global descriptor connection manner used in the present invention. As can be seen from Table 1, computational overheads required for global descriptors are negligible, indicating that the network has an efficient semantic guidance function. In addition, ablation experiments related to a quantity of embedded GFR modules in a baseline network is further performed, including embedding of one GFR module, embedding of two GFR modules, embedding of three GFR modules, and embedding of one GFR module in each level (a total of four GFR modules) used in the present invention. The results show that the embedding of one GFR module in each level used in the present invention is more appropriate for acquiring a global receptive field and reducing semantic gaps between features in different levels.

Figure 6:
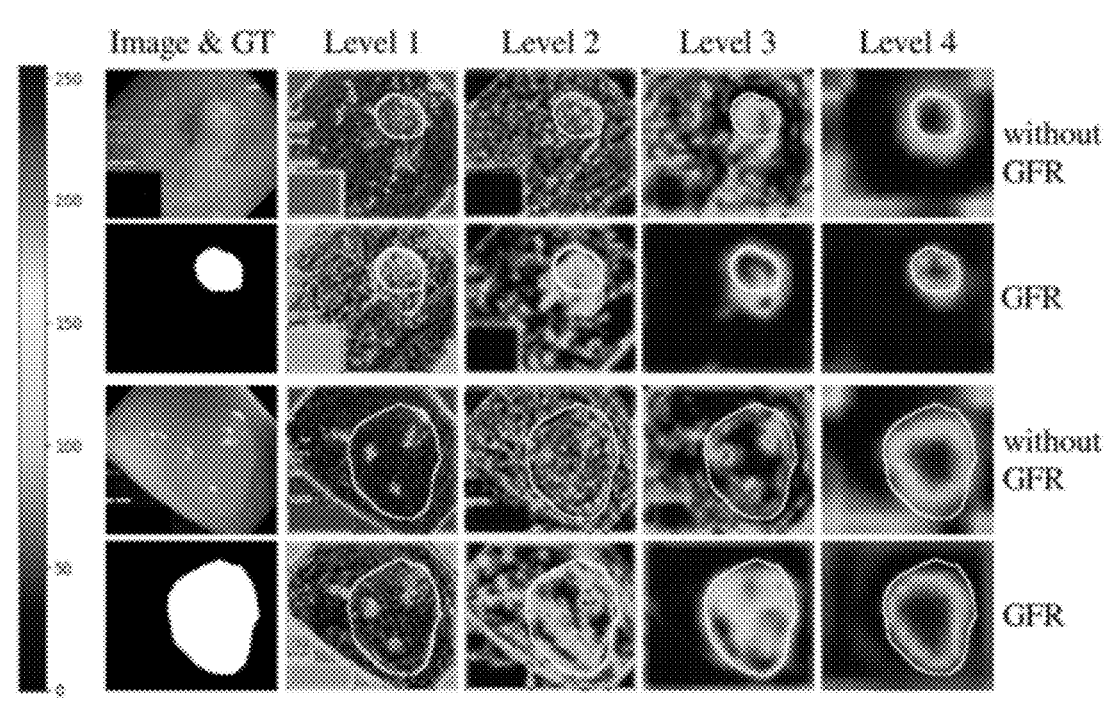
FIG. 6 shows visualized comparison of feature maps with and without GFR modules embedded in skip connections.

FIG. 6 shows visualized output feature maps using original simple skip connections of U-Net and using the GFR modules in the present invention as skip connections. The feature maps are averaged in a channel direction, and 0-255 normalization processing is performed. As can be seen from FIG. 6, the GFR modules in the present invention can highlights response to segmentation targets and suppress response to irrelevant background noise, indicating that the GFR modules can reduce semantic information differences between features in different levels.

(c) In the ablation experiment of the LFR module, as can be seen from Table 1, the embedding of an LFR module in a baseline network (baseline network+LFR) can also comprehensively enhance the segmentation performance. This benefits from the capability of recovering spatial information of high-stage feature maps of the LFR module. GFLOPs indicators show that it is more efficient to use the LFR module in place of an original decoder module of the baseline network. This benefits from that a channel compression technique is used in LFR. To verify that low-stage feature maps have a guidance effect for an upsampling process of constructing high-stage feature maps, the guidance of low-stage feature maps of the LFR module is deleted (baseline network+LFR_/w/o_LG). That is, low-stage feature maps do not participate in the prediction of a local reconstruction kernel. Experimental results show that the segmentation performance is reduced compared with the use of a complete LFR module, indicating that the guidance of low-stage feature maps is very necessary in the reconstruction of spatial information. Ablation experiments related to a quantity of LFR modules are also listed in Table 1. Experimental results show that the use of one LFR module in each stage in the present invention is most appropriate for the reconstruction of spatial information and alignment of features in adjacent stages.

(d) Computational complexity analysis. For a common self-attention mechanism-based non-local module, because similarities between all pixels need to be calculated, the computational complexity of the module is $O(N^2)$, where $N=H\times W$ represents the size of a feature map. The global feature reconstruction GFR module provided in the present invention is an improvement to a self-attention mechanism. The GFR module uses global descriptors to implement the compression of features in a spatial channel, thereby reducing the computational complexity to $O(d_k N)$. $d_k$ is a quantity of global descriptors, and $d_k \ll N$. Therefore, the computational complexity of the GFR module is much lower than that of a non-local module. The GFR module can be conveniently inserted into an encoder-decoder network. The local feature reconstruction LFR module provided in the present invention only uses pixels in a k×k neighborhood of a pixel for reconstruction, and therefore the computational complexity of the module is $O(k^2 N)$, where $k \ll N$. In a specific embodiment of the present invention, the value of k is 5, and d is set to 8 times a quantity of segmentation classes.

Experiment 2: Segmentation of Choroidal Atrophy in Fundus Images

Pathological myopia and its complications are common important factors that cause visual impairment or even blindness. Choroidal atrophy is an early pathological change of pathological myopia. Therefore, the segmentation of choroidal atrophy in fundus images is highly significant for the prevention and treatment of pathological myopia. However, in pathological myopia in different stages, the shape and size of choroidal atrophy vary greatly, and there are blurred boundaries. Therefore, the segmentation of choroidal atrophy in fundus images is challenging.

600 fundus images of pathological myopia from the Ophthalmology Center of the Shanghai General Hospital are used to perform performance evaluation on GLFRNet provided in the present invention. The size of each image is 2032×1934. The images are randomly divided into a training set including 320 images, a validation set including 80 images, and a test set including 200 images. To reduce computational overheads, original images are downsampled to 512×512 in the present invention. Online data augmentation is implemented by using methods such as random contrast transformation, brightness transformation, left-right flip, up-down flip, and −60- to 60-degree rotation. Dice coefficient, IoU, Sensitivity (Sen), and Accuracy (Acc) are used as objective evaluation indicators.

Figure 7:
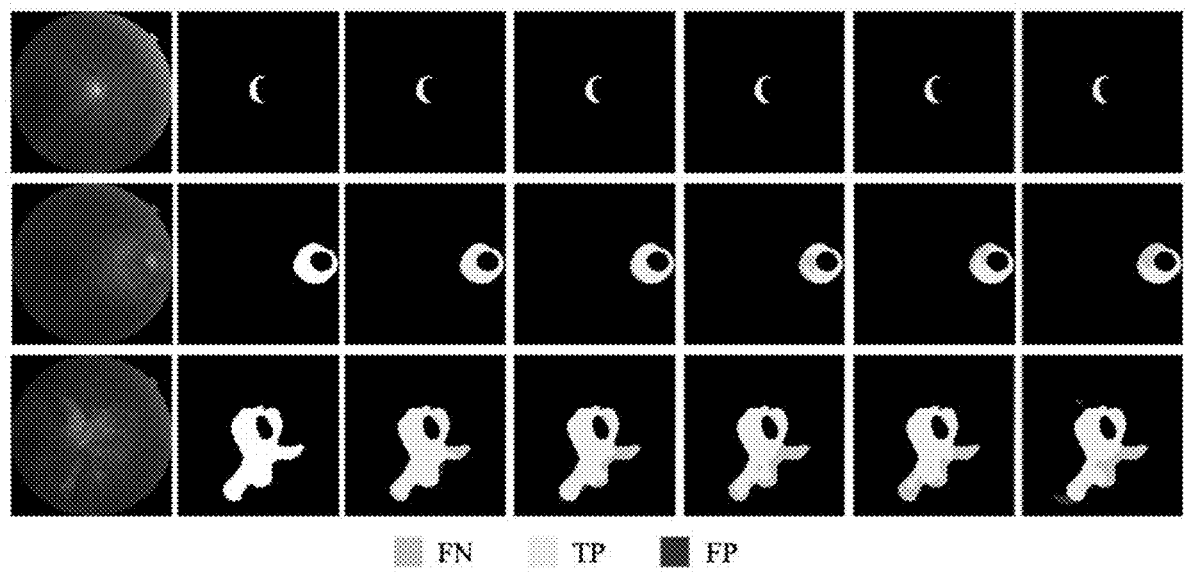
FIG. 7 shows comparison of choroid atrophy segmentation results of GLFRNet and other excellent networks according to the present invention.

Table 2 shows results of comparison experiments and ablation experiments related to choroid atrophy segmentation. As can be seen from Table 2, the Dice, IoU, Sen, and Acc of GLFRNet in the present invention reach 87.61%, 79.28%, 86.12%, and 98.50% respectively. Compared with a baseline network, three key indicators Dice, IoU, and Sen of GLFRNet are significantly increased. Compared with other excellent segmentation networks, the increase in the Dice indicator of GLFRNet has a significant difference (Wilcoxon signed-rank test, p<0.05). Results of ablation experiments also prove the effectiveness of the GFR module and the LFR module provided in the present invention. FIG. 7 shows choroid atrophy segmentation results of different methods. As can be seen from FIG. 7, although the shape and size of choroidal atrophy vary greatly in pathological myopia in different stages, the GFR module and the LFR module of GLFRNet provided in the present invention can process large targets and small targets from a global perspective and a local perspective respectively, thereby obtaining excellent segmentation performance.

Table 2 Results of comparison experiments and ablation experiments of segmentation of choroidal atrophy in fundus images (p-value represents a statistical difference obtained by performing a Wilcoxon signed-rank test on average Dice coefficients of GLFRNet in the present invention and other methods, and when p-value is less than 0.05, it indicates that the two have a significant difference).

TABLE 2

| | Method | Dice (%) | IoU (%) | Sen (%) | Acc (%) | p-value |
|---|---|---|---|---|---|---|
| Comparison experiment | U-Net | 84.55 | 74.76 | 82.43 | 98.22 | <0.001 |
| | UNet++ | 84.57 | 74.77 | 82.86 | 98.26 | <0.001 |
| | EMANet | 85.32 | 76.00 | 82.42 | 98.39 | <0.001 |
| | GCN | 85.52 | 76.31 | 84.53 | 98.34 | <0.001 |
| | PSPNet | 85.72 | 76.5 | 84.2 | 98.30 | <0.001 |
| | DeepLabV3+ | 86.16 | 77.19 | 85.10 | 98.41 | <0.001 |
| | CPFNet | 86.27 | 77.3 | 84.33 | 98.31 | <0.001 |
| | PraNet | 86.48 | 77.65 | 84.65 | 98.38 | <0.001 |
| | CE-Net | 86.66 | 77.96 | 84.74 | 98.41 | 0.003 |
| | SFNet | 86.85 | 78.02 | 84.16 | 98.43 | 0.003 |
| Ablation experiment | Baseline network | 84.46 | 74.82 | 80.43 | 98.25 | <0.001 |
| | Baseline network + GFR_w/o_Conn | 85.32 | 76.29 | 82.80 | 98.22 | <0.001 |
| | Baseline network + GFR_w/o_DS | 86.27 | 77.37 | 84.36 | 98.33 | <0.001 |
| | Baseline network + GFR | 86.97 | 78.31 | 84.98 | 98.38 | 0.021 |
| | Baseline network e + LFR_w/o_LG | 85.87 | 76.86 | 83.55 | 98.38 | <0.001 |
| | Baseline network + LFR | 86.48 | 77.58 | 84.58 | 98.39 | <0.001 |
| | GLFRNet | 87.61 | 79.28 | 86.12 | 98.50 | — |

Experiment 3: Segmentation of multi-class retinal fluid in retinal OCT images Retinal fluid is a phenomenon that an leaked fluid accumulates within the intercellular space of retina due to the disruption in blood-retinal barrier, and mainly includes three types, intraretinal fluid (IRF), subretinal fluid (SRF), and pigment epithelial layer detachment (PED). Retinal fluid is a clinical pathological representation of various fundus diseases in a macular area, such as diabetic retinopathy and age-related macular degeneration. Due to problems such as highly variable shapes and blurred boundaries, the joint segmentation of multi-class retinal fluid is facing great challenges.

70 three-dimensional OCT data (a total of 6936 two-dimensional B scan images) provided in RETOUCH Challenge at MICCAI 2017 are used to evaluate the performance of GLFRNet in the present invention in joint segmentation of multi-class retinal fluid. Due to a relatively small amount of data, a 3-fold cross validation strategy is used in comparison experiments and ablation experiments. That is, the 70 three-dimensional OCT data are randomly divided into three folds 23, 23, and 24. Two folds of data are used each time to perform model training, and the remaining fold of data is used for a test. Each two-dimensional B scan image is resized and an region of interest of 256×512 is cut out according to a pixel grayscale distribution characteristic for use as an input of GLFRNet. In a test stage, each two-dimensional B scan image in a three-dimensional OCT volume is segmented respectively. Segmentation results are recombined according to an original order into a three-dimensional result, and evaluation indicators are calculated in an overall three-dimensional manner, including Dice coefficient, IoU, Sen, and Acc.

Figure 9:
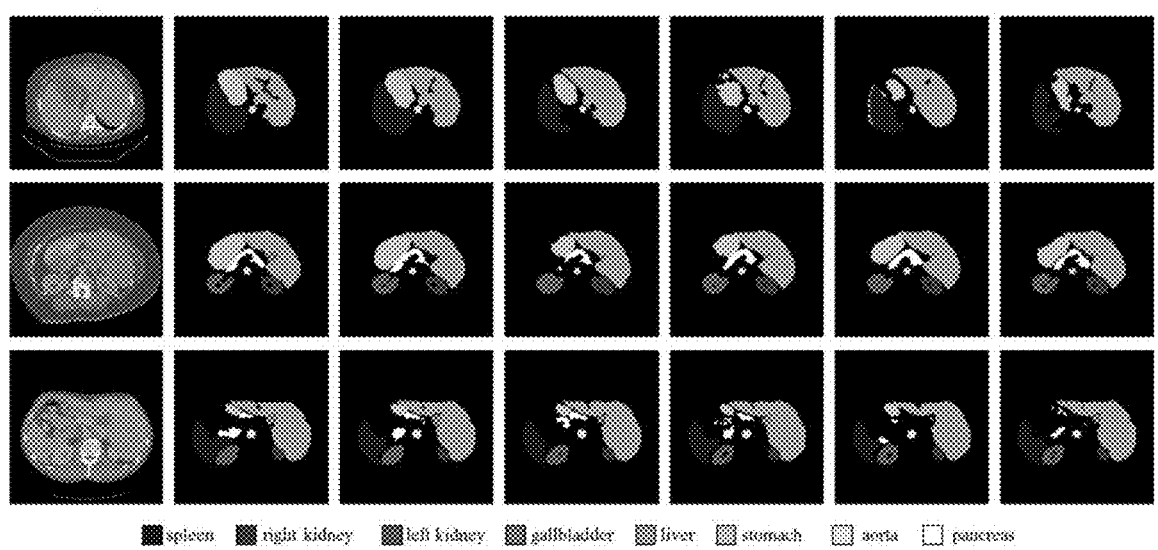
FIG. 9 shows comparison of multi-organ segmentation results of GLFRNet and other excellent networks according to the present invention.

Table 3 shows results of comparison experiments and ablation experiments of multi-class retinal fluid segmentation. As can be seen from Table 3, GLFRNet in the present invention is compared with ten other excellent segmentation networks. An increase in the Dice indicator of GLFRNet in the present invention is significantly different from all these networks (Wilcoxon signed-rank test, p<0.05). Because an fluid target in OCT images is relatively small, networks without skip connections such as EMANet and PSPNet have relatively poor segmentation performance. Because a feature-dense connection is used in skip connections, UNet++ has achieved high performance. In the sensitivity (Sen) indicator, DeepLabV3+ has achieved performance equivalent to that of GLFRNet in the present invention. However, IoU and Dice indicators of DeepLabV3+ are clearly lower than those of GLFRNet in the present invention, indicating that DeepLabV3+ has an over-segmentation problem. Results of the ablation experiments show that benefiting from the GFR module and the LFR module, in three types of segmentation of retinal fluids, the performance of the method in the present invention is stably improved, proving the effectiveness of the two modules. FIG. 9 shows segmentation results of multi-class retinal fluid using different methods. As shown in FIG. 9, GLFRNet in the present invention has significantly improved segmentation performance for three types of retinal fluids.

Table 3 Results of comparison experiments and ablation experiments of multi-class retinal fluid segmentation in retinal OCT images (lines 1-10 are results of comparison experiments, and lines 11-13 are results of ablation experiments; and p-value represents a statistical difference obtained by performing a Wilcoxon signed-rank test on average Dice coefficients of GLFRNet in the present invention and other methods, and when p-value is less than 0.05, it indicates that the two have a significant difference).

is performed by using random contrast enhancement and random brightness enhancement. Dice coefficient and Hausdorff distance are used as objective evaluation indicators.

Table 4 shows results of comparison experiments and ablation experiments of multi-organ segmentation. Benefiting from a semantic flow-based feature map semantic align-

TABLE 3

| Method | Dice (%) | | | | IoU (%) | | | | Sen (%) | | | | Acc (%) | p-value Average |
| --- | --- | --- | --- | --- | --- | --- | --- | --- | --- | --- | --- | --- | --- | --- |
| | average | PED | SRF | IRF | Average | PED | SRF | IRF | Average | PED | SRF | IRF | Overall | dice |
| EMANet | 70.78 | 68.67 | 74.74 | 68.92 | 57.60 | 55.99 | 63.04 | 53.78 | 69.27 | 67.61 | 70.83 | 69.37 | 99.10 | <0.001 |
| PSPNet | 71.26 | 68.76 | 76.13 | 68.90 | 58.07 | 56.03 | 64.39 | 53.80 | 70.29 | 67.08 | 75.12 | 68.66 | 99.13 | <0.001 |
| CENet | 71.40 | 68.22 | 76.36 | 69.62 | 58.60 | 55.59 | 65.06 | 55.15 | 70.64 | 67.73 | 75.61 | 68.59 | 99.17 | <0.001 |
| U-Net | 71.69 | 66.38 | 76.88 | 71.81 | 58.93 | 53.76 | 65.65 | 57.39 | 70.87 | 65.64 | 76.49 | 70.47 | 99.17 | <0.001 |
| Attention U-Net | 72.17 | 67.33 | 77.09 | 72.10 | 59.38 | 54.68 | 65.72 | 57.74 | 71.27 | 67.29 | 76.04 | 70.47 | 99.17 | <0.001 |
| GCN | 72.50 | 70.21 | 75.7 | 71.58 | 59.63 | 57.52 | 64.46 | 56.90 | 73.04 | 70.44 | 76.01 | 72.66 | 99.15 | <0.001 |
| CPFNet | 73.01 | 69.99 | 76.59 | 72.45 | 60.12 | 57.12 | 65.41 | 57.83 | 72.38 | 67.79 | 76.24 | 73.12 | 99.17 | <0.001 |
| DeepLabV3+ | 73.77 | 71.78 | 78.48 | 71.05 | 60.71 | 58.69 | 67.09 | 56.33 | 76.29 | 76.20 | 79.05 | 73.62 | 99.15 | <0.001 |
| SFNet | 73.83 | 71.22 | 78.24 | 72.04 | 61.31 | 59.14 | 67.16 | 57.63 | 72.27 | 71.13 | 75.20 | 70.48 | 99.24 | <0.001 |
| U-Net++ | 74.10 | 71.38 | 78.01 | 72.90 | 61.38 | 58.53 | 67.02 | 58.59 | 74.42 | 71.87 | 78.29 | 73.10 | 99.21 | <0.001 |
| Baseline network | 73.05 | 70.02 | 76.67 | 72.45 | 60.24 | 57.08 | 65.47 | 58.17 | 71.31 | 67.61 | 74.30 | 72.02 | 99.21 | <0.001 |
| Baseline network + GFR | 75.02 | 73.35 | 79.25 | 72.47 | 62.50 | 60.97 | 68.13 | 58.41 | 75.47 | 76.41 | 79.02 | 70.98 | 99.24 | 0.045 |
| Baseline network + LFR | 74.55 | 71.99 | 78.95 | 72.73 | 62.01 | 59.70 | 67.83 | 58.50 | 74.03 | 71.76 | 79.42 | 70.90 | 99.23 | 0.003 |
| GLFRNet | 76.11 | 74.63 | 79.78 | 73.92 | 63.73 | 62.25 | 69.05 | 59.90 | 76.85 | 76.02 | 80.65 | 73.87 | 99.28 | — |

Experiment 4: Multi-Organ Segmentation in Abdominal CT Images

The segmentation of organs in abdominal CT images is the basis for quantitative analysis of related viscera and diseases. In recent years, in multi-organ segmentation, the performance of a deep learning-based method is greatly improved as compared with conventional methods such as a method based on a statistical shape model or a multi-atlas model. However, because organs have great deformations and blurred boundaries, multi-organ joint segmentation in abdominal CT images are still facing great challenges.

Figure 8:
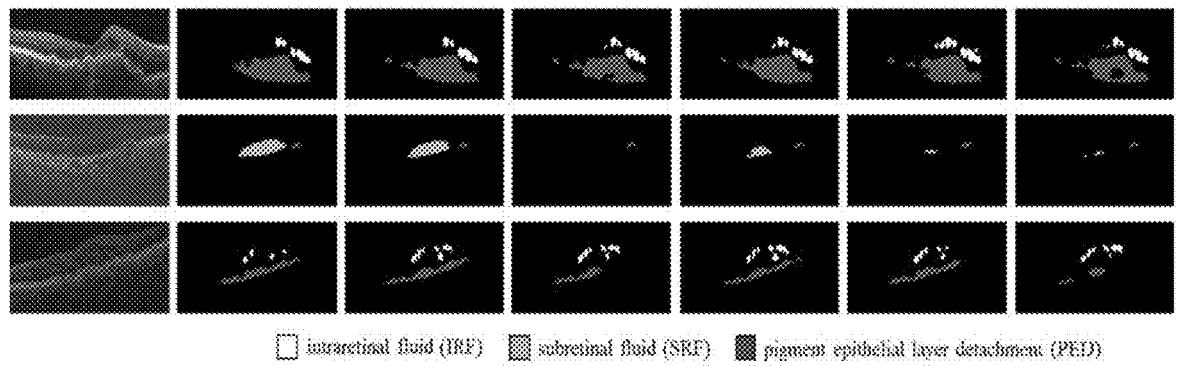
FIG. 8 shows comparison of multi-class retinal fluid segmentation results of GLFRNet and other excellent networks according to the present invention.

30 abdominal CT scans (a total of 3779 axial-scan slice images) from the Multi-Atlas Abdomen Labeling Challenge at MICCAI 2015 are used to evaluate multi-organ joint segmentation performance of GLFRNet in the present invention, and mainly include eight abdominal organs: spleen, right kidney, left kidney, gallbladder, liver, stomach, aorta, and pancreas. Due to a relatively small amount of data, a 3-fold cross validation strategy is used for performance evaluation. To utilize context information of a three-dimensional space, each axial slice image and two adjacent images before and after the axial slice are combined into one three-channel image as "2.5D" data for use as an input of the network. That is, an input of the network is an image group including three slices. An outputted prediction result corresponds to the intermediate slice. Online data augmentation ment, SFNet has obtained high segmentation performance in multi-organ segmentation. GLFRNet in the present invention has obtained optimal performance in the comparison experiments. With the embedding of a GFR module and an LFR module, except that the Dice indicator of the right kidney is slightly lower than that of SFNet, in the method of the present invention, the Dice indicator of other seven organs are all higher than those of other excellent segmentation methods, and the improvement of the average Dice indicator is significantly different (Wilcoxon signed-rank test, p<0.05). An average Hausdorff distance is also significantly smaller than that of other segmentation methods. FIG. 8 shows multi-organ segmentation results of different methods. As shown in FIG. 8, GLFRNet of the present invention implements more accurate segmentation both for small organs such as gallbladder and large organs such as stomach.

Table 4 Results of comparison experiments and ablation experiments of multi-organ segmentation in abdominal CT images (lines 1-9 are results of comparison experiments, and lines 10-12 are results of ablation experiments; and p-value represents a statistical difference obtained by performing a Wilcoxon signed-rank test on average Dice coefficients of GLFRNet in the present invention and other methods, and when p-value is less than 0.05, it indicates that the two have a significant difference).

TABLE 4

| | Dice (%) | | | | | | | | | HD (mm) | p-value |
| --- | --- | --- | --- | --- | --- | --- | --- | --- | --- | --- | --- |
| Method | Average | Spleen | Right kidney | Left kidney | Gallbladder | Liver | Stomach | Aorta | Pancreas | Average | Average dice |
| U-Net | 75.09 | 88.64 | 86.19 | 87.22 | 40.8 | 93.92 | 69.66 | 86.42 | 47.89 | 21.17 | <0.001 |
| Attention U-Net | 76.58 | 89.6 | 84.43 | 87.88 | 46.31 | 93.95 | 72.78 | 87.09 | 50.58 | 21.68 | <0.001 |

TABLE 4-continued

| Method | Dice (%) | | | | | | | | | HD (mm) Average | p-value Average dice |
|---|---|---|---|---|---|---|---|---|---|---|---|
| | Average | Spleen | Right kidney | Left kidney | Gallbladder | Liver | Stomach | Aorta | Pancreas | | |
| UNet++ | 76.59 | 89.79 | 88.65 | 89.23 | 33.17 | 95.12 | 73.93 | 88.13 | 54.67 | 21.98 | <0.001 |
| EMANet | 77.76 | 90.15 | 87.09 | 88.31 | 41.26 | 94.19 | 77.76 | 87.86 | 55.42 | 13.21 | <0.001 |
| DeepLabV3+ | 77.83 | 89.42 | 87.51 | 90.06 | 44.93 | 94.51 | 75.54 | 88.1 | 52.57 | 16.73 | <0.001 |
| CENet | 78.16 | 90.57 | 87.6 | 89.47 | 42.03 | 94.81 | 76.22 | 87.48 | 57.14 | 19.96 | <0.001 |
| PSPNet | 78.92 | 90.64 | 87.69 | 89.07 | 46.08 | 94.22 | 77.21 | 88.13 | 58.36 | 15.17 | <0.001 |
| CPFNet | 80.09 | 89.62 | 88.98 | 89.59 | 51.07 | 95.04 | 77.86 | 89.18 | 59.4 | 12.02 | <0.001 |
| SFNet | 82.94 | 91.6 | 89.98 | 90.01 | 62.91 | 95.57 | 78.94 | 89.65 | 64.9 | 10.72 | <0.001 |
| Baseline network | 80.63 | 90.37 | 88.6 | 90.56 | 53.28 | 94.63 | 77.11 | 88.53 | 61.96 | 14.41 | <0.001 |
| Baseline network + GFR | 83.33 | 90.84 | 89.93 | 91.44 | 60.61 | 95.71 | 81.57 | 89.93 | 66.61 | 9.14 | 0.004 |
| Baseline network + LFR | 83.4 | 91.68 | 89.18 | 91.33 | 60.22 | 95.61 | 81.11 | 90.43 | 67.69 | 11.43 | 0.007 |
| GLFRNet in the invention | 84.79 | 92.59 | 89.20 | 90.58 | 67.11 | 95.89 | 83.91 | 90.28 | 68.72 | 8.55 | — |

At this point, a novel deep learning network GLFRNet applicable to medical image segmentation has been implemented and is verified. Based on the global feature reconstruction GFR module and the local feature reconstruction LFR module provided in the present invention, the GLFRNet network has adequately overcome deficiencies such as insufficient extraction of global context features and difficult reconstruction of spatial information of a U-shaped encoder-decoder network. Comprehensive verification experiments are performed on the GLFRNet segmentation network in the present invention in four different types of imaging manner and lesion target segmentation tasks, including colorectal polyp segmentation in colonoscopy images, segmentation of choroidal atrophy in fundus images, segmentation of multi-class retinal fluid in retinal OCT images, and multi-organ segmentation in abdominal CT images, and the segmentation performance is good, indicating that the method in the present invention has high universality in medical image segmentation.

Figure 10:
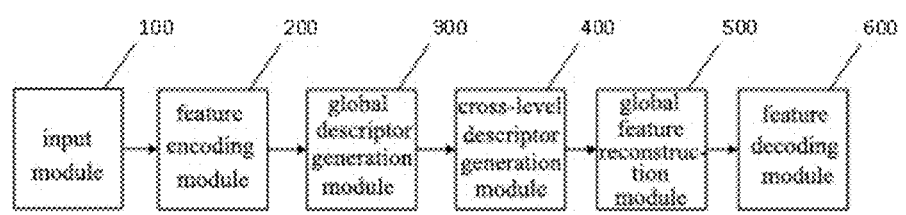
FIG. 10 is a structural block diagram of a global and local feature reconstruction network-based medical image segmentation apparatus according to an embodiment of the present invention.

Referring to FIG. 10, FIG. 10 is a structural block diagram of a global and local feature reconstruction network-based medical image segmentation apparatus according to an embodiment of the present invention. A specific apparatus may include:
- an input module 100, configured to input a to-be-detected image into a pretrained global and local feature reconstruction network, where the global and local feature reconstruction network includes a feature encoding module, a global feature reconstruction GFR module, and a feature decoding module based on a local feature reconstruction LFR module, and the global feature reconstruction GFR module is embedded in a skip connection between the feature encoding module and the feature decoding module;
- a feature encoding module 200, configured to perform downsampling a plurality of times on the to-be-detected image by using the feature encoding module, to obtain feature maps in a plurality of levels;
- a global descriptor generation module 300, configured to generate a global descriptor for each level of feature map by using the global feature reconstruction GFR module;
- a cross-level descriptor generation module 400, configured to generate a cross-level global descriptor of the each level of feature map by using the global feature reconstruction GFR module in combination with the global descriptor of the each level of feature map and a global descriptor of a high-level feature map;
- a global feature reconstruction module 500, configured to predict a reconstruction weight of all pixels in the each level of feature map by using the global feature reconstruction GFR module, multiply the reconstruction weight by the cross-level global descriptor to implement feature reconstruction, and perform addition with the each level of feature map to obtain a global reconstruction feature map of each level; and
- a feature decoding module 600, configured to perform fusion upsampling on an adjacent higher-stage local reconstruction feature map and an adjacent lower-level global reconstruction feature map by using a local feature reconstruction module in the feature decoding module, to obtain a current-stage high-resolution semantic feature map, and upsample a first-stage high-resolution semantic feature map to obtain a target segmentation prediction image.

The global and local feature reconstruction network-based medical image segmentation apparatus in this embodiment is configured to implement the foregoing global and local feature reconstruction network-based medical image segmentation method. Therefore, for specific implementations in the global and local feature reconstruction network-based medical image segmentation apparatus, reference may be made to the embodiment part of the foregoing global and local feature reconstruction network-based medical image segmentation method. For example, the input module 100, the feature encoding module 200, the global descriptor generation module 300, the cross-level descriptor generation module 400, the global feature reconstruction module 500, and the feature decoding module 600 are configured to implement steps S101, S102, S103, S104, S105, and S106 in the foregoing global and local feature reconstruction network-based medical image segmentation method respectively. Therefore, for the specific implementation of the apparatus, reference may be made to the descriptions in corresponding parts of embodiments. Details are not described again herein.

A specific embodiment of the present invention further provides a global and local feature reconstruction network-based medical image segmentation device, including: a memory, configured to store a computer program; and a processor, configured to execute the computer program to implement the steps of the foregoing global and local feature reconstruction network-based medical image segmentation method.

A specific embodiment of the present invention further provides a computer-readable storage medium, a computer program is stored on the computer-readable storage medium, the computer program being executed by a processor to implement the steps of the global and local feature reconstruction network-based medical image segmentation method.

A person skilled in the art should understand that the embodiments of the present application may be provided as a method, a system or a computer program product. Therefore, the present application may use a form of hardware only embodiments, software only embodiments, or embodiments with a combination of software and hardware. Moreover, the present application may use a form of a computer program product that is implemented on one or more computer-usable storage media (including but not limited to a disk memory, a CD-ROM, an optical memory, and the like) that include computer usable program code.

The present application is described with reference to the flowcharts and/or block diagrams of the method, the device (system), and the computer program product according to the embodiments of the present application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, the foregoing embodiments are merely examples for clear description, rather than a limitation to implementations. For a person of ordinary skill in the art, other changes or variations in different forms may also be made based on the foregoing description. All implementations cannot and do not need to be exhaustively listed herein. Obvious changes or variations that are derived there from still fall within the protection scope of the invention of the present invention.

What is claimed is:

1. A global and local feature reconstruction network-based medical image segmentation method, comprising:
    inputting a to-be-detected image into a pre-trained global and local feature reconstruction network, wherein the global and local feature reconstruction network comprises a feature encoding module, a global feature reconstruction GFR module, and a feature decoding module based on a local feature reconstruction LFR module, and the global feature reconstruction GFR module is embedded in a skip connection between the feature encoding module and the feature decoding module;
    performing feature extraction on the to-be-detected image by using the feature encoding module, to obtain feature maps in a plurality of levels;
    generating a global descriptor for each level of feature map by using the global feature reconstruction GFR module;
    generating a cross-level global descriptor of the each level of feature map by using the global feature reconstruction GFR module in combination with the global descriptor of the each level of feature map and a global descriptor of a high-level feature map;
    predicting a reconstruction weight of all pixels in the each level of feature map by using the global feature reconstruction GFR module, multiplying the reconstruction weight by the cross-level global descriptor to implement feature reconstruction, and performing addition with the each level of feature map to obtain a global reconstruction feature map of each level;
    performing fusion upsampling on an adjacent higher-stage local reconstruction feature map and an adjacent lower-level global reconstruction feature map by using a local feature reconstruction module in the feature decoding module, to obtain a current-stage high-resolution semantic feature map; and
    upsampling a first-stage high-resolution semantic feature map to obtain a target segmentation prediction image.

2. The global and local feature reconstruction network-based medical image segmentation method according to claim 1, wherein a loss function used in a training process of the global and local feature reconstruction network is a total loss function $L_{total}=L_{seg}+\lambda\Sigma_{l=1}^{4}L_{A_l}$, wherein l is the number of levels, $L_{seg}$ is a joint segmentation loss function based on a cross-entropy loss and a Dice loss, $L_{A_l}$ is a joint deep supervision loss function based on a cross-entropy loss and a Dice loss, and λ is a trade-off coefficient between a segmentation loss $L_{seg}$ and a deep supervision loss $L_{A_l}$.

3. The global and local feature reconstruction network-based medical image segmentation method according to claim 1, wherein the feature encoding module uses ImageNet pretrained ResNet34 as a backbone network with a last global pooling layer and a fully connected layer removed.

4. The global and local feature reconstruction network-based medical image segmentation method according to claim 1, wherein the generating a global descriptor for each level of feature map by using the global feature reconstruction GFR module comprises:
    flattening a feature map according to a spatial dimension of the feature map, to obtain $X_l \in \mathbb{R}^{d_{in} \times HW}$ as an input of the global feature reconstruction GFR module;
    inputting $X_l$ into two 1*1 convolution layers to generate an attention map $A_l \in \mathbb{R}^{d_k \times HW}$ and an embedded feature $B_l \in \mathbb{R}^{d_v \times HW}$ respectively; and generating a global descriptor of the feature map according to the attention map and the embedded feature:

$$Z_l = [z_l^1, z_l^2, \ldots, z_l^{d_k}] = \rho(A_l)B_l^T \in \mathbb{R}^{d_k \times d_h},$$

wherein l represents the number of a level in which the feature map is located, $d_{in}$ represents a quantity of channels of the feature map, H and W represent a height and a width of the feature map respectively, $\rho(\cdot)$ represents performing a softmax normalization operation according to the spatial dimension, to make a weight sum equal to 1, $d_h$ and $d_k$ represent a dimension of the global descriptor and a quantity of global descriptors respectively, the dimension of the global descriptor of the each level of feature map is set to a minimum quantity of channels in features in all levels, and each global descriptor $z_l^s$ (s=1,2,3, . . . , $d_k$) is obtained by performing weighted summation on all features in a space $B_l$.

5. The global and local feature reconstruction network-based medical image segmentation method according to claim 4, wherein the generating a cross-level global descriptor of the each level of feature map by using the global feature reconstruction GFR module in combination with the global descriptor of the each level of feature map and a global descriptor of a high-level feature map comprises:

generating a cross-level global descriptor $Z_l'$ of an $l^{th}$ level by using $Z_l' = \text{concat}(Z_l, Z_{l+1}, \ldots, Z_{l+m}) \in \mathbb{R}^{(m+1)d_k \times d_h}$, wherein $Z_{l+1}, \ldots Z_{l+m}$ represent global descriptors generated from feature maps of an $(l+1)^{th}$ level to an $(l+m)^{th}$ level, and concat represents a concatenation operation of the global descriptors.

6. The global and local feature reconstruction network-based medical image segmentation method according to claim 1, wherein the predicting a reconstruction weight of all pixels in the each level of feature map by using the global feature reconstruction GFR module, multiplying the reconstruction weight by the cross-level global descriptor to implement feature reconstruction, and performing addition with the each level of feature map to obtain a global reconstruction feature map of each level comprises:

making a feature map $X_l$ pass through one 1*1 convolution layer to obtain a reconstruction weight $V_l \in \mathbb{R}^{(m+1)d_k \times HW}$, wherein m represents a quantity of global descriptors that are generated from a high-level feature map corresponding to a feature map in an $l^{th}$ level and are connected to the feature map of the $l^{th}$ level;

normalizing the reconstruction weight by using a softmax function in a channel direction to obtain a reconstructed feature $\tilde{X}_l = Z_l'^T \text{softmax}(V_l)$; and recovering a quantity of channels from the reconstructed feature $\tilde{X}_l \in \mathbb{R}^{d_h \times HW} \hat{X}_l$ through a 1*1 convolution layer, and adding the quantity of channels to the feature map $X_l$ to obtain the global reconstruction feature map.

7. The global and local feature reconstruction network-based medical image segmentation method according to claim 1, wherein the performing fusion upsampling on an adjacent higher-stage local reconstruction feature map and an adjacent lower-level global reconstruction feature map by using a local feature reconstruction module in the feature decoding module, to obtain a current-stage high-resolution semantic feature map comprises:

making the feature decoding module comprise local feature reconstruction LFR modules of a plurality of stages, inputs of local feature reconstruction LFR modules being denoted as Y and Z, wherein the input Y of a fourth-stage LFR module is an output of a fourth-level global feature reconstruction GFR module, the input Z is an output of a third-level global feature reconstruction GFR module, the input Y of an first-stage LFR module is an output of a second-stage LFR module, the input Z is a feature map of an encoder zeroth level, and inputs Y and Z of a third-stage LFR module and the second-stage LFR module are an output of an adjacent higher-stage LFR module and an output of an adjacent lower-level GFR module respectively;

making two input feature maps Y and Z of the local feature reconstruction LFR module pass through two 1*1 convolution layers to reduce a quantity of channels respectively;

performing bilinear upsampling on Y to make the two input feature maps reach the same spatial resolution, adding and fusing the two input feature maps element-wise, and making a result pass through one 3×3 convolution layer to obtain a predicted value $\mathcal{K} = \text{softmax}(\text{conv}_f(\text{Up}(\theta(Y)) + \psi(Z)))$ of a local reconstruction kernel $\mathcal{K} \in \mathbb{R}^{k^2 \times H \times W}$, wherein k is a neighbourhood size of local feature reconstruction, H and W are a height and a width of the feature map, $\theta(\cdot)$ and $\psi(\cdot)$ represent 1×1 convolution with parameters $w_\theta$ and $W_\psi$ respectively, $\text{Up}(\cdot)$ represents bilinear interpolation upsampling, $\text{conv}_f(\cdot)$ represents a 3×3 convolution, and a softmax function is used for normalizing a predicted reconstruction kernel;

making Y pass through a 3×3 convolution layer to reduce a quantity of channels, and using bilinear interpolation upsampling $\text{Up}(\cdot)$ for upsampling to have the same resolution as Z, to obtain $\overline{Y} = \text{Up}(\text{conv}(Y))$;

performing linear combination on a k×k neighbourhood at each position [i,j] by using the predicted value of the local reconstruction kernel to implement local feature reconstruction:

$$Y'[i,j] = \Sigma_{n=-r}^{r} \Sigma_{m=-r}^{r} \mathcal{K}_{[i,j]}[n,m]\overline{Y}[i+n, j+m],$$

wherein $\mathcal{K}_{[i,j]} \in \mathbb{R}^{k \times k}$, $r = \lfloor k/2 \rfloor$, and [i+n, j+m] are neighbourhood features;

concatenating a reconstructed local feature map Y' and the input Z according to a channel dimension, and performing fusion using two 3×3 convolution layers to obtain an output $Y_{out}$ of a current-stage LFR module; and using $Y_{out}$ and the adjacent lower-level global reconstruction feature map or the feature map of the encoder zeroth level as two inputs of a next stage LFR module, to obtain the current-stage high-resolution semantic feature map.

8. A global and local feature reconstruction network-based medical image segmentation device, comprising:
a memory, configured to store a computer program; and
a processor, configured to execute the computer program to implement the steps of the global and local feature reconstruction network-based medical image segmentation method according to claim 1.

9. A non-transitory computer-readable storage medium, wherein a computer program is stored on the non-transitory computer-readable storage medium, the computer program being executed by a processor to implement steps of the global and local feature reconstruction network-based medical image segmentation method according to claim 1.

10. A global and local feature reconstruction network-based medical image segmentation apparatus, comprising:
an input module, configured to input a to-be-detected image into a pretrained global and local feature reconstruction network, wherein the global and local feature reconstruction network comprises a feature encoding module, a global feature reconstruction GFR module, and a feature decoding module based on a local feature reconstruction LFR module, and the global feature reconstruction GFR module is embedded in a skip connection between the feature encoding module and the feature decoding module;

a feature encoding module, configured to perform feature extraction on the to-be-detected image by using the feature encoding module, to obtain feature maps in a plurality of levels;

a global descriptor generation module, configured to generate a global descriptor for each level of feature map by using the global feature reconstruction GFR module;

a cross-level descriptor generation module, configured to generate a cross-level global descriptor of the each level of feature map by using the global feature reconstruction GFR module in combination with the global descriptor of the each level of feature map and a global descriptor of a high-level feature map;

a global feature reconstruction module, configured to predict a reconstruction weight of all pixels in the each level of feature map by using the global feature reconstruction GFR module, multiply the reconstruction weight by the cross-level global descriptor to implement feature reconstruction, and perform addition with the each level of feature map to obtain a global reconstruction feature map of each level; and a feature decoding module, configured to perform fusion upsampling on an adjacent higher-stage local reconstruction feature map and an adjacent lower-level global reconstruction feature map by using a local feature reconstruction module in the feature decoding module, to obtain a current-stage high-resolution semantic feature map, and upsample a first-stage high-resolution semantic feature map to obtain a target segmentation prediction image.

* * * * *